US008679583B2

(12) United States Patent
Kerechanin, II et al.

(10) Patent No.: US 8,679,583 B2
(45) Date of Patent: Mar. 25, 2014

(54) METHODS FOR APPLYING A POWDER METAL LAYER TO POLYMER ARTICLES AS AN ANTIFOULING COATING

(75) Inventors: Charles W. Kerechanin, II, Columbia, MD (US); Justin S. Morrison, Baltimore, MD (US); Craig B. Leese, Sykesville, MD (US); Paul J. Biermann, Columbia, MD (US); Ryan J. Forrest, Columbia, MD (US); William R. Setzler, Millersville, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 13/597,665

(22) Filed: Aug. 29, 2012

(65) Prior Publication Data

US 2013/0095234 A1  Apr. 18, 2013

Related U.S. Application Data

(60) Provisional application No. 61/546,666, filed on Oct. 13, 2011.

(51) Int. Cl.
*B05D 5/00* (2006.01)

(52) U.S. Cl.
USPC ........... 427/230; 427/231; 427/233; 427/236; 427/133; 427/134; 427/135; 427/180; 427/181; 427/202; 427/203; 427/205; 427/404; 427/407.1; 427/421.1; 427/427

(58) Field of Classification Search
None
See application file for complete search history.

(56) References Cited

U.S. PATENT DOCUMENTS

| | | | | |
|---|---|---|---|---|
| 4,323,599 A | * | 4/1982 | Marshall | 427/181 |
| 4,410,642 A | | 10/1983 | Layton | |
| 4,618,504 A | * | 10/1986 | Bosna et al. | 427/455 |
| 4,895,881 A | | 1/1990 | Bigner | |
| 5,393,568 A | * | 2/1995 | Valente et al. | 427/385.5 |
| 5,614,006 A | * | 3/1997 | Algar | 106/18.31 |
| 2003/0155688 A1 | | 8/2003 | Oram et al. | |
| 2010/0278771 A1 | * | 11/2010 | Lobe et al. | 424/78.09 |
| 2011/0217544 A1 | * | 9/2011 | Young et al. | 428/327 |

FOREIGN PATENT DOCUMENTS

| | | |
|---|---|---|
| GB | 1464386 | 2/1977 |
| GB | 1600120 | 10/1981 |
| GB | 2084488 | 4/1982 |
| GB | 2107211 | 4/1983 |
| JP | 60115504 | 6/1985 |
| JP | 7242456 | 9/1995 |
| JP | 11012478 | 1/1999 |
| WO | 8303804 | 11/1983 |

* cited by examiner

*Primary Examiner* — Erma Cameron
(74) *Attorney, Agent, or Firm* — Noah J. Hayward

(57) ABSTRACT

A method of making an antifouling article includes providing a mold having a mold cavity and a mold surface for defining an article. The method also includes applying a mold release material to the mold surface. The method further includes coating the mold surface with a plurality of metallic powder particles comprising an antifouling agent. Still further, the method includes filling the mold with a curable polymeric material. Yet further, the method includes curing the polymeric material and forming an article having a surface defined by the mold surface, the surface of the article having the plurality of metallic powder particles disposed thereon and comprising an antifouling coating.

19 Claims, 4 Drawing Sheets

METHODS FOR APPLYING A POWDER METAL LAYER TO POLYMER ARTICLES AS AN ANTIFOULING COATING

CROSS-REFERENCE TO RELATED APPLICATIONS

This application claims priority to and the benefit of prior-filed U.S. Provisional Application No. 61/546,666 filed on Oct. 13, 2011, the content of which is herein incorporated by reference in its entirety.

STATEMENT OF GOVERNMENTAL INTEREST

This invention was made with U.S. Government support under contract number 2007*0719123*000. The U.S. Government has certain right in the invention.

BACKGROUND

Exemplary embodiments of the present invention relate to a method of a making an antifouling coating for polymeric articles, and more particularly, a method of applying a powder metal layer as an antifouling coating to a polymeric article.

Marine biofouling or fouling occurs to some degree on virtually all marine structures and equipment, including various structures and equipment that employ polymeric articles. The degree of fouling depends on many factors, including the marine environment in which the article is used (i.e. the geographic location and water conditions, including temperature, turbidity, etc.) as well as the depth at which the article is used. Plant or soft fouling, such as by algae and slimes, occurs in the near surface region (e.g., 50 m or less), but may also occur at deeper depths, while hard fouling, such as by shellfish and the like, can occur down to about 150 m, for example.

Biofouling of various polymeric articles, such those employed with various acoustic devices is particularly problematic because the mechanical and other means used to remove such fouling may also damage the surface of such articles and effect the performance of the acoustic device. Various continuous coatings of antifouling agents have been employed, such as various antifouling paints, but these are generally not useful when the polymeric article is flexible, such as flexible articles formed from various elastomeric materials. The use of various coatings employing metallic particles have been suggested, but these coatings and the methods employed to make these articles may not be suitable for use on flexible polymeric articles, particularly those having complex surface shapes, and more particularly those used with acoustic devices that must be able to transmit and/or receive acoustic signals through the coating.

Therefore, methods of making antifouling coatings for use on polymeric articles and the articles themselves, particularly flexible articles having complex surface shapes, and more particularly those used with acoustic devices that must be able to transmit and/or receive acoustic signals through the coating, are very desirable.

SUMMARY

In an exemplary embodiment, a method of making an antifouling article is disclosed. The method includes providing a mold having a mold cavity and a mold surface for defining an article. The method also includes applying a mold release material to the mold surface. The method further includes coating the mold surface with a plurality of metallic powder particles comprising an antifouling agent. Still further, the method includes filling the mold with a curable polymeric material. Yet further, the method includes curing the polymeric material and forming an article having a surface defined by the mold surface, the surface of the article having the plurality of metallic powder particles disposed thereon and comprising an antifouling coating.

In another exemplary embodiment, a method of making an antifouling article is disclosed. The method includes providing a mold having a mold cavity and a mold surface for defining an article. The method also includes forming a mixture of a first curable polymeric material and a plurality of metallic powder particles comprising an antifouling agent. The method further includes applying a layer of the mixture to the mold surface. The method further includes filling the mold cavity with a second curable polymeric material prior to curing the first curable polymer. Still further, the method includes curing the first polymeric material and the second polymeric material to form an article having a surface defined by the mold surface, the surface of the article having the plurality of powder particles disposed thereon.

DETAILED DESCRIPTION

Figure 1:
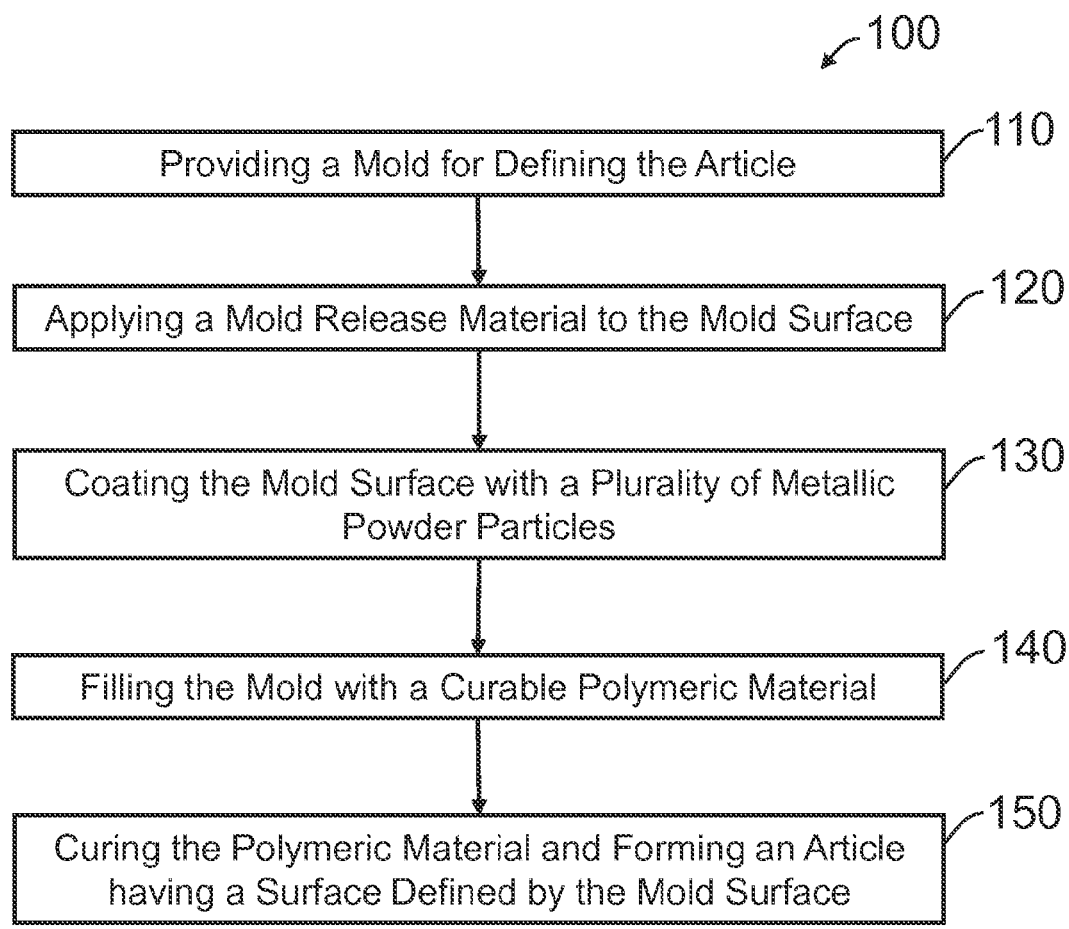
FIG. 1 is a flowchart of an embodiment of a method of applying a powder metal layer to a polymeric article as an antifouling coating as disclosed herein.
Figure 2:
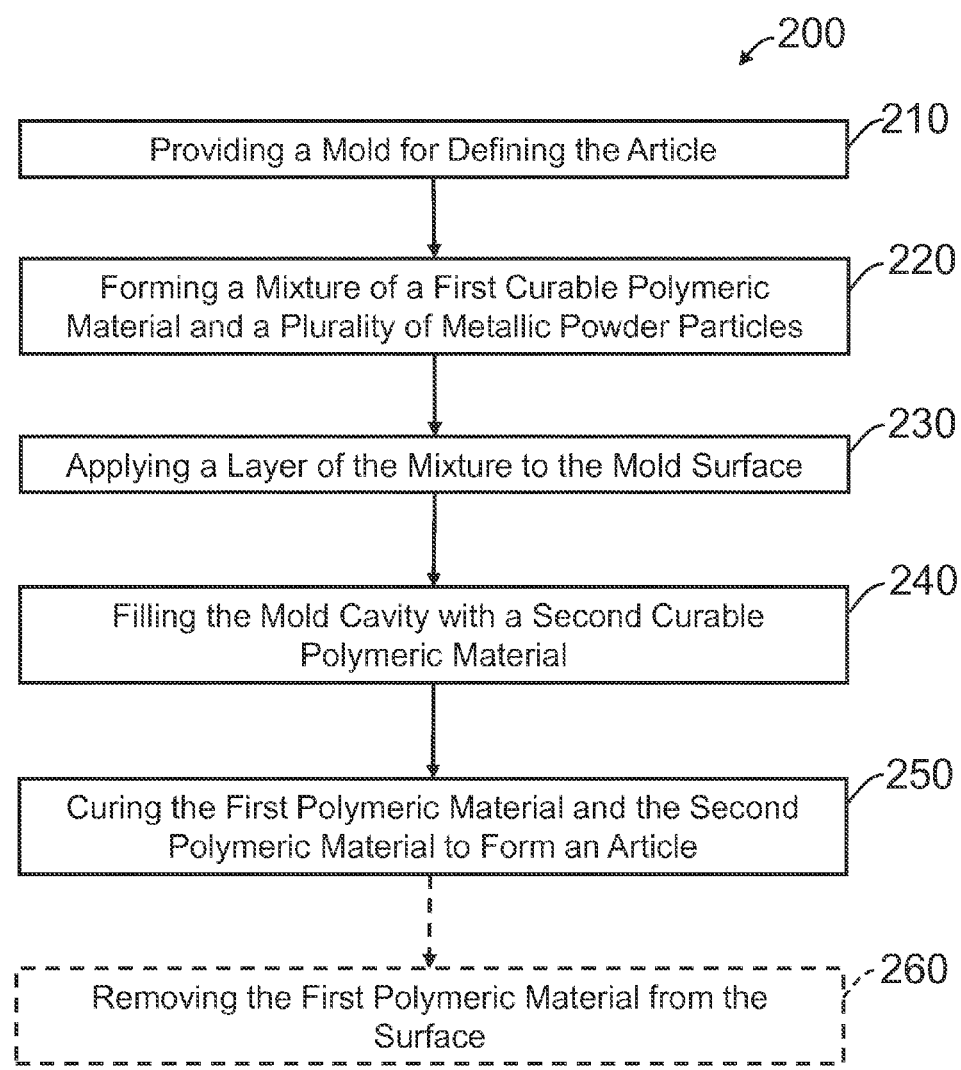
FIG. 2 is a flowchart of a second embodiment of a method of applying a powder metal layer to a polymeric article as an antifouling coating as disclosed herein; of FIG. 3 is a cross-sectional view of an exemplary embodiment of a polymeric article having a powder metal layer formed thereon as an antifouling coating according to the method of FIG. 1.

Referring to the Figures, and particularly to FIGS. 1 and 2, in exemplary embodiments, methods for applying a powder metal layer to polymer articles as an antifouling coating are disclosed. The methods of making antifouling coatings for use on polymeric articles and the polymer articles themselves are disclosed. The methods are particularly suited for making antifouling coatings on flexible polymeric articles that are configured to resiliently undergo severe deformation, or that have complex surface shapes, or both, and more particularly those used with acoustic devices that must be able to transmit and/or receive acoustic signals through the antifouling coating without any substantial loss of the acoustic signals. The methods are also particularly suited for making antifouling coatings on polymeric articles having complex shapes where it is not desirable to apply known antifouling paints due to operational constraints, including outgassing of volatile organic compounds (VOCs) or other hazardous materials or a degree of deformation that would cause paints to delaminate or otherwise flake off the surface of the article. In contrast with antifouling paints, the methods described herein provide articles with the antifouling agent (metallic particles) exposed at the surface that is exposed to the marine environment rather than embedded within the paint, thereby increasing their antifouling potential over articles coated with antifouling paints. Articles 10 having antifouling coatings made according to the methods described herein have coatings that are very durable. Those that are formed from low durometer elastomeric materials may, for example, be bent, rolled, folded, stretched and otherwise severely deformed without damaging the antifouling coating layer. The antifouling coating layers made by the methods described herein are very advantageous in that they are particularly well suited for use with various acoustic articles used for transmitting and receiving various acoustic signals, particularly those used in a marine environment, and more particularly various hydrophones, acoustic transducers (e.g., those used in fish finders and depth finders), sonar domes or acoustic windows used in various marine articles. The antifouling coating layers made by the methods described herein are also very advantageous in that they are particularly well suited for use with various control surfaces, particularly flexible control surfaces, which require antifouling surfaces. The methods may also be used to make articles having antifouling coating layers that are very thin, as well as very durable, including antifouling coating layers having a thickness of about one to about five times the average particle size, and more particularly about two to about four times the average particle size.

Figure 3:
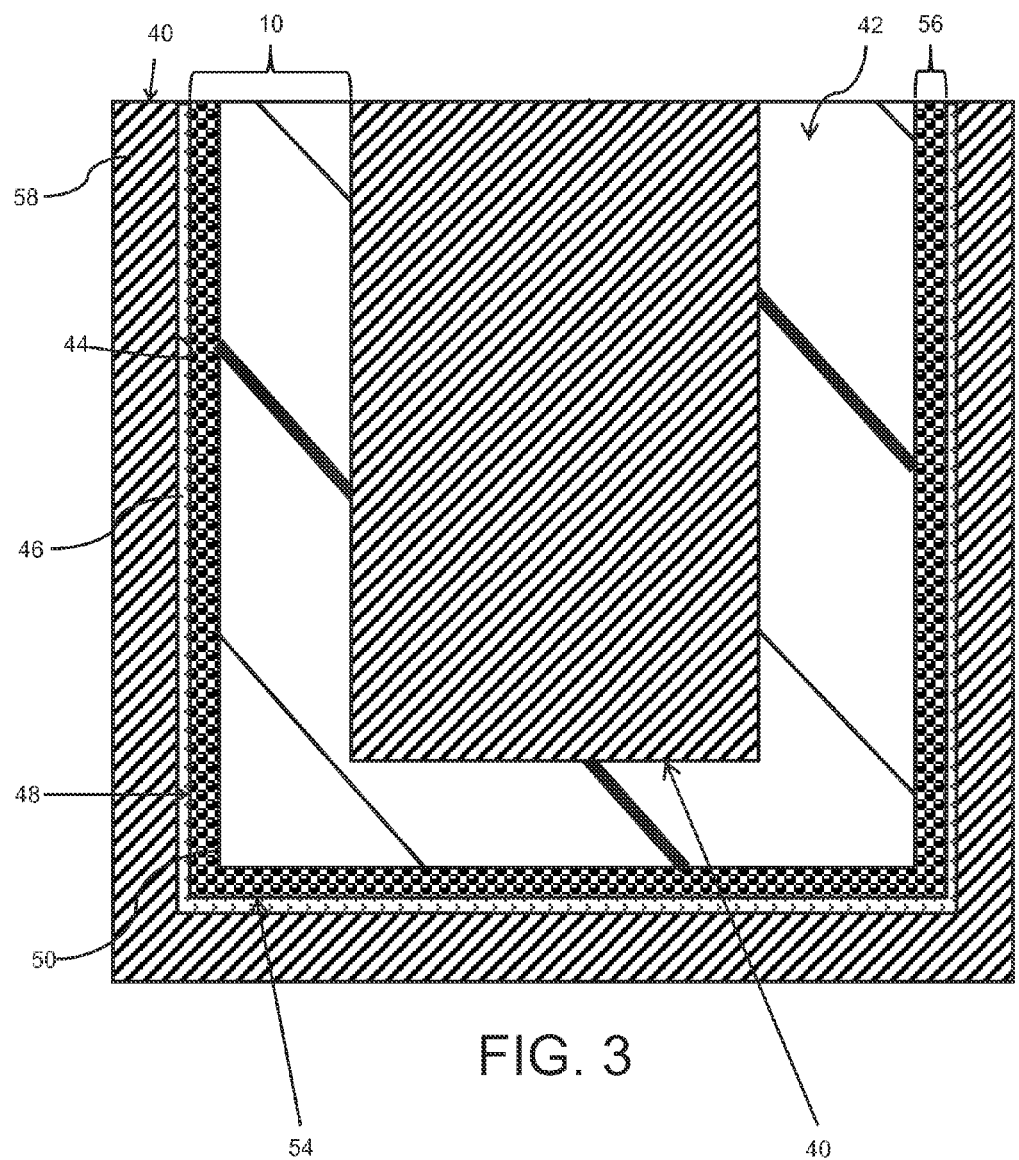

Referring to FIGS. 1 and 3, a method 100 of making an antifouling article 10 is disclosed. The method 100 may briefly be described as applying a mold release compound to a mold surface in a mold cavity followed by apply a metallic powder having a small particle size (e.g., about 250 mesh to about 400 mesh) to the mold surface that has the mold release compound, whereupon the metallic powder coats this mold surface, followed by filling the mold cavity with a polymeric material, preferably a flexible polymeric material such as an elastomer, and curing the polymeric material to form an polymeric article that has the metallic powder captured on a corresponding surface of the article. Without limiting the foregoing, applying the metallic powder to the mold surface having the mold release compound is somewhat analogous to greasing and flouring a pan as a mold prior to baking dough in the pan, whereupon the flour is often transferred from the pan surface to the baked article.

Referring again to FIGS. 1 and 3, the method 100 includes providing 110 a mold 40 having a mold cavity 42 and a mold surface 44 for defining the article 10. The method 100 also includes applying 120 a mold release material 46 to the mold surface 44. The method 100 further includes coating 130 the mold surface with a plurality of metallic powder particles 48 comprising an antifouling agent 50. Still further, the method 100 includes filling the mold with a curable polymeric material 52. Yet further, the method 100 includes curing 150 the polymeric material 52 to form an article 10 having a surface 54 defined by the mold surface 44, the surface 54 of the article 10 having the plurality of metallic powder particles 48 disposed thereon and comprising an antifouling coating 56 that includes the metallic powder particles 48 disposed on or embedded within the polymeric material 52.

Providing 110 a mold 40 having a mold cavity 42 and a mold surface 44 for defining an article 10 may include any suitable mold 40. Mold 40 may be formed from any suitable mold material 58, which may include various polymers, ceramics, metals or inorganic materials, or a combination thereof. In one embodiment, the mold material 58 may include aluminum or an aluminum alloy and the mold 40 and mold cavity 42 may be rigidly defined. In another embodiment, the mold material 58 may include a silicone and the mold 40 and mold cavity 42 may be resiliently and flexibly defined. The mold 40 may have any suitable shape and size and includes a mold cavity 42 and a mold surface 44 that together define the shape and size of the articles 10 formed therein. The mold 40 may be used to define any suitable article 10, including various marine acoustic articles and control surfaces as described herein.

Applying 120 a mold release material 46 to the mold surface 44 may be performed in any suitable manner and may utilize any suitable mold release compound, material or agent. The mold release material will generally be selected to obtain a slip effect sufficient to release the molded article 10 from the mold 40. The selection of the mold release material will generally depend on the mold material 58 selected, the shape of the article 10 and the curable polymeric material 52 selected. In one embodiment, where the mold material includes a polymeric material, such as a silicone (e.g. a silicone rubber mold material such as Silicones Inc. P-44 platinum cured silicone), the curable polymeric material 52 includes a urethane and a suitable mold release material such as UNIVERSAL MOLD RELEASE® made by Smooth-On, Inc.

Coating 130 the mold surface 44 with a plurality of metallic powder particles 48 comprising an antifouling agent 50 may be performed by any suitable coating method. In one embodiment, coating 130 may include inserting a plurality of powder particles 48 into the mold 40 and moving the mold 40 or the metallic particles, or a combination thereof, to form a coating of the plurality powder particles 48 on the mold surface 44. Inserting the plurality of powder particles 48 may be accomplished in any suitable manner, including pouring the powder particles 48 into the mold cavity 42. Moving the mold or the particles, or a combination thereof, may be performed in any suitable manner, including rotating the mold or shaking the mold, or a combination thereof. In another embodiment, coating 130 includes spraying the plurality of powder particles 48 onto the mold surface 44 and mold release material 46.

Filling 140 the mold 40 with a curable polymeric material 52 may be performed in any suitable manner and utilize any suitable curable polymeric material. In one embodiment, filling 140 the mold with the polymeric material 52 includes resin casting or injecting a thermoset polymeric material or a thermoplastic polymeric material, or a combination thereof, into the mold 40. The use of the term "curable polymeric material" herein is intended to broadly encompass thermoset polymeric materials as well as thermoplastic polymeric materials. Curable thermoset materials may include various two-part (or more constituent part) resins systems. Curable thermoplastic resins, include those that are heated to reduce their viscosity and "cure" upon cooling below a predetermined temperature, such as a glass transition temperature, or which, for example, utilize a cross-linking agent to affect cross-linking of the polymeric material. Resin casting may include gravity casting where the resin is poured into and fills the mold cavity 42 by gravity, and may be done in the ambient atmosphere or under a controlled atmosphere. The casting may also be done in a vacuum chamber (when using open molds) to extract gas bubbles that may occur during mixing of the resin (e.g., two-part resins), or in a pressure pot, to reduce their size to the point where they aren't visible. Pressure and/or centrifugal force may also be used to help push the curable liquid resin into the mold cavity 42. The mold 40 may also be vibrated to expel gas bubbles and facilitate filling of the mold cavity 42. In thermoplastic injection molding, the curable polymeric material is fed into a heated barrel, mixed, and forced into the mold cavity 42 where it cools and hardens (cures) to the configuration of the mold cavity 42. For thermoplastic materials pelletized raw material may be fed through a hopper into a heated barrel with a reciprocating screw. Upon entrance to the barrel the thermal energy increases and the viscosity is reduced, which enables the ability to induce flow with the available driving force of the injection unit. The screw delivers the raw material forward, mixes and homogenizes the thermal and viscous distributions of the polymer, and pushes the curable polymeric material 52 into the mold cavity 42. In thermoset injection molding, typically two different chemical components are injected into the barrel where they are injected into the mold cavity 42. These components immediately begin irreversible chemical reactions which eventually crosslinks (cures) the material into a single connected network of molecules. As the chemical reaction occurs the two fluid components cure and permanently transform into a viscoelastic solid.

Curing 150 the polymeric material 52 and forming an article 10 having a surface 54 defined by the mold surface 44, the surface of the article having the plurality of metallic powder particles 48 disposed thereon and comprising an antifouling coating 56 may be performed in any suitable manner using any suitable polymer curing mechanism, including those described above. In one embodiment, forming an article 10 from the polymeric material 52 having a surface 54 defined by the mold surface 44 comprises polymerizing a thermoset polymer or a thermoplastic polymer to form the article and define the surface.

The metallic material 60 used to form metallic powder particles 48 may include any metallic material that acts as an antifouling agent. In one embodiment, the metallic material 60 includes lead, copper, cobalt, zinc, nickel, zirconium, molybdenum, tin, iron or manganese, or a combination thereof. Of the metallic materials 60, copper is particularly useful as an antifouling agent, including pure copper, which may be defined as metallic materials having greater than 95% by weight of copper, or a copper alloy, including various brass (copper-zinc), bronze (copper-tin) or copper-nickel alloys. The metallic material 60 is in the form of a plurality of metallic powder particles 48. The metallic powder particles 48 may have any suitable particle shape and size that will adhere to the mold release material 46 and the mold surface 44. In one embodiment, the metallic powder particles have an average size of about 250 mesh or less, and more particularly about 250 to about 400 mesh (U.S. Standard Sieve Size). The method 100 and metallic powder particles 48 be used to make articles 10 having antifouling coating layers 56 that are very thin, as well as very durable, including antifouling coating layers having a thickness of about one to about five times the average particle size, and more particularly about two to about four times the average particle size. In one embodiment, this may include antifouling coating layers 56 having a thickness of about 0.0015 inches to about 0.011 inches, and more particularly 0.0017 inches to about 0.011, and even more particularly about 0.0030 inches to about 0.009 inches. The metallic powder particles 48 may have any suitable particle shape, including substantially spherical particles, as well as other regular or irregular regular particle shapes, or combinations thereof, including those shapes characteristic of crushed particles. The thickness will depend in part on the amount, particularly the thickness, of the mold release material 46 applied to the surface of the mold 44, as the amount of material will define the amount of metallic material 60 and number of metallic powder particles 48 that may be loaded onto the surface of the mold 44.

The thin, durable antifouling coating layers 56 having the thicknesses described may be used in conjunction with any suitable article 10 that may be subject to fouling. This includes a wide variety of marine articles, but may also include a wide variety of non-marine articles that are exposed continuously or periodically to moisture and subject to biofouling, including the growth of algae, mold and mildew. The thin, durable antifouling coating layers 56 are particularly suited for use with marine acoustic articles 10 for transmitting or receiving an acoustic signal. These include, for example, acoustic articles 10 comprising hydrophones, marine acoustic transducers, sonar domes or acoustic windows. The antifouling coating layers 56, particularly those having the thicknesses described herein, result in substantially no loss of the acoustic signal being transmitted or received through these marine articles 10.

The polymeric material 52 may include any suitable polymeric material that is configured to provide a suitable antifouling article 10, including various antifouling acoustic articles 10 having a surface comprising an antifouling coating 56 layer having a plurality of metallic powder particles 48 disposed thereon, as described herein. In one embodiment, the polymeric material 52 comprises an elastomer. Any suitable elastomer may be used, including thermoset elastomers or thermoplastic elastomers, or a combination thereof. Thermoset elastomers may include those comprising an ester, epoxy, phenolic, imide, formaldehyde, silicone or urethane polymer, or a combination thereof. Thermoplastic elastomers may include, for example, various styrenic block copolymers, polyolefin blends, elastomeric alloys, thermoplastic polyurethanes, thermoplastic copolyesters or thermoplastic polyamides, or a combination thereof.

Figure 4:
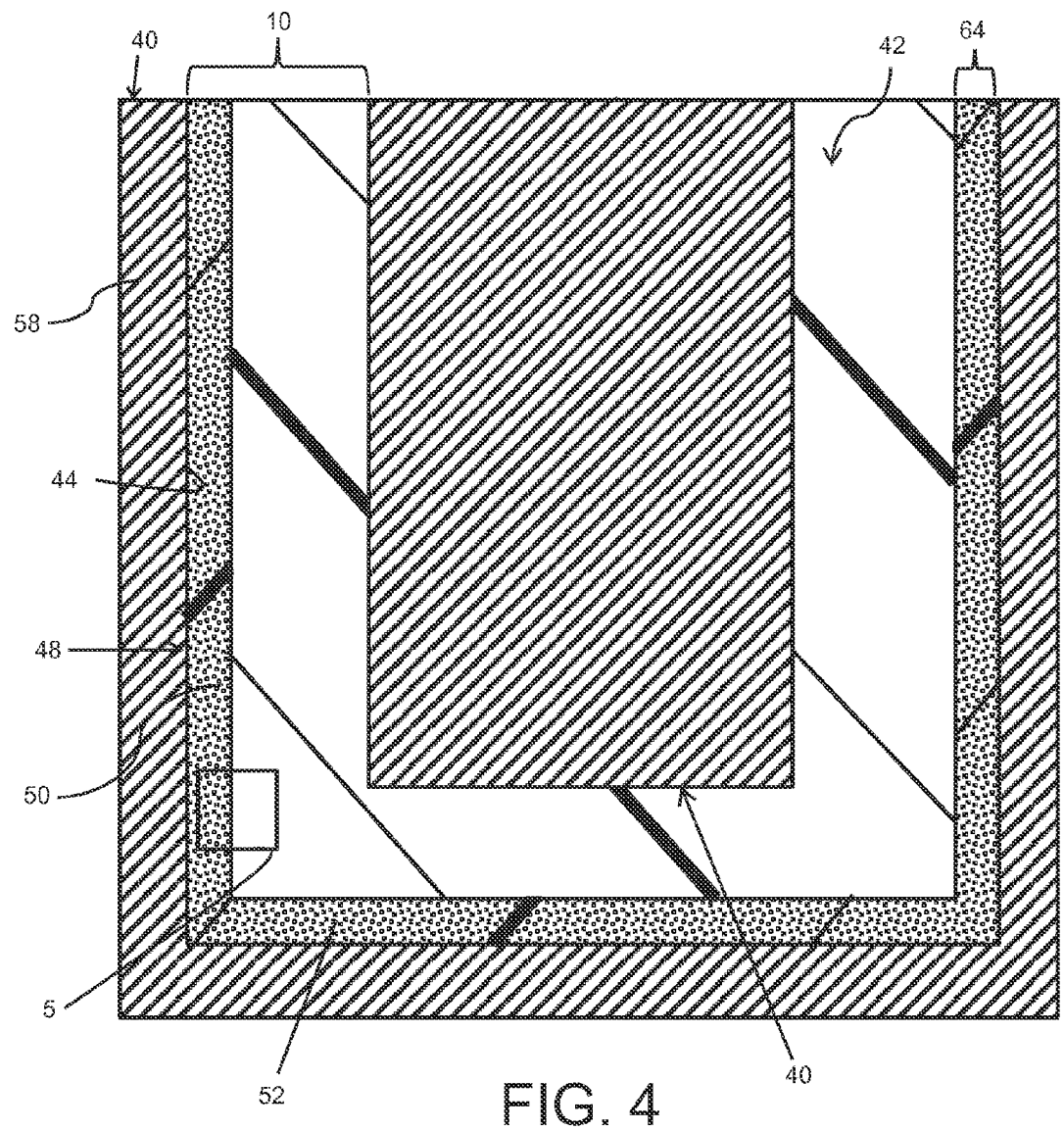
FIG. 4 is a cross-sectional view of another exemplary embodiment of a polymeric article having a powder metal layer formed thereon as an antifouling coating according to the method of FIG. 2.
Figure 5:
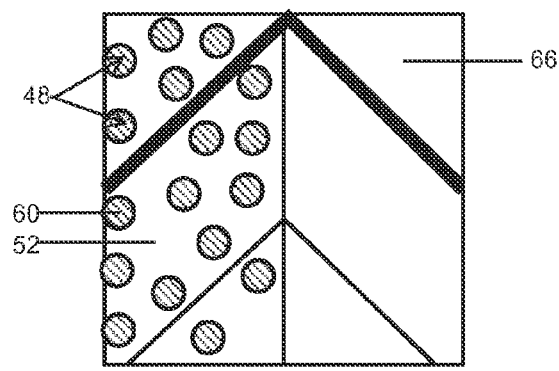
FIG. 5 is an enlarged cross-sectional view of region 5 of FIG. 4.

Referring to FIGS. 2, 4 and 5, in another embodiment, a method 200 of making an antifouling article 10 is disclosed that generally includes mixing a curable polymeric material 52 and a plurality of metallic powder particles 48 to form a mixture that can be applied to a mold surface 44 followed by filling the remainder of the mold cavity 42 with the same, or alternately a different, curable polymeric material 52, followed by curing the polymeric material to form an article 10 with an antifouling coating 64 layer at the surface 54 of the article. The method 200 includes providing 210 a mold 40 having a mold cavity 42 and a mold surface 44 for defining an article 10. The method 200 also includes forming 220 a mixture of a first curable polymeric material 52 and a plurality of metallic powder particles 48 comprising an antifouling agent 50. The method 200 further includes applying 230 a layer 64 of the mixture to the mold surface 44. Still further, the method 200 filling 240 the mold cavity 42 with a second curable polymeric material 66 prior to curing the first curable polymeric material 52. Yet further, the method 200 includes curing 250 the first polymeric material 52 and the second polymeric material 66 to form an article 10 having a surface 54 defined by the mold surface 44, the surface 54 of the article 10 having the plurality of powder particles 48 disposed thereon. The method may also optionally include removing 260 the polymeric material 52 at the surface 54 to increase the surface area of the plurality of powder particles at the surface 54 of the article 10, such as by abrading the surface to remove the polymeric material 52.

Providing 210 a mold 40 having a mold cavity 42 and a mold surface 44 for defining an article 10 may be accomplished using any suitable mold 40. The mold 40 may be formed from any suitable mold material 58, which may include various polymers, ceramics, metals or inorganic materials, or a combination thereof. The mold 40 may have any suitable shape and size and includes a mold cavity 42 and a mold surface 44 that together define the shape and size of the articles 10 formed therein. The mold 40 may be used to define any suitable article 10, including various marine acoustic articles and control surfaces as described herein.

Forming 220 a mixture of a first curable polymeric material 52 and a plurality of metallic powder particles 48 comprising an antifouling agent 50 may be performed by employing any suitable mixing apparatus and mixing method. In one example, this may include pouring the metallic powder particles and resin into a conventional mixing or stirring apparatus.

Applying 230 a layer 64 of the mixture to the mold surface 44 may be performed using any suitable application apparatus and method. In one example, applying 230 may be performed by various painting apparatus and methods, including brushing, rolling, pads or spraying apparatus and methods.

Filling 240 the mold cavity 42 with a second curable polymeric material 66 prior to curing the first curable polymeric material 52 may be performed in any suitable manner and using any suitable filling apparatus and method. The first curable polymeric material and second polymeric material may be same material or different materials, and may comprise any of the curable polymeric materials described herein. In one example, the first curable polymeric material and the second polymeric material comprise an elastomer, including a thermoset elastomer, such as an ester, epoxy, phenolic, imide, formaldehyde, silicone or urethane polymer, or a combination thereof. In one embodiment, filling 240 may comprise casting or injecting a thermoset polymer or a thermoplastic polymer, or a combination thereof, into the mold 40.

Curing 250 the first polymeric material 52 and the second polymeric material 66 to form an article 10 having a surface 54 defined by the mold surface 44, the surface 54 of the article 10 having the plurality of powder particles 48 disposed thereon may be performed in any suitable manner using any suitable polymer curing mechanism, including those described herein. In one embodiment, forming an article 10 from the polymeric material 52 having a surface 54 defined by the mold surface 44 comprises polymerizing a thermoset polymer or a thermoplastic polymer to form the article and define the surface.

The method 200 may also optionally include removing 260 the polymeric material 52 at the surface 54 to increase the surface area of the plurality of powder particles at the surface 54 of the article 10. The polymeric material 52 may be removed in any suitable manner, including abrasion or grinding, to expose the plurality of powder particles and increase their surface area at the surface 54.

The method 200 may also be used to make any of the articles 10 described herein, including acoustic articles for transmitting or receiving an acoustic signal where the antifouling coating results in substantially no loss of the acoustic signal.

The method 100 generally provides more exposed surface area of the metallic particles in the as-molded condition than method 200, and hence, tends to provide a more effective antifouling coating in the as-molded condition. However, method 200 generally tends to have the metallic particles embedded in the polymeric material to a greater degree, and hence, may provide a more durable antifouling coating in the as-molded condition. Articles 10 formed by method 200 also may have their effectiveness as an antifouling coating enhanced by abrasion of the antifouling coating surface to remove the polymeric material, expose the metallic particles and enhance their effectiveness as an antifouling agent.

While exemplary embodiments of the invention have been described herein, it will be understood by those of ordinary skill in the art that various changes may be made and equivalents may be substituted for elements thereof without departing from the sprit or scope of the present invention. In addition, many modifications may be made to adapt a particular situation or material to the teachings of the invention without departing from the scope thereof. Therefore, it is intended that the invention not be limited to the particular embodiments disclosed as the best mode contemplated for carrying out this invention, but that the invention will include all embodiments falling within the scope of the present application, as defined by the claims appended hereto.

What is claimed is:

1. A method of making an antifouling article, the method comprising:
   providing a mold having a mold cavity and a mold surface for defining an article;
   applying a mold release material to the mold surface;
   coating the mold surface with a plurality of metallic powder particles comprising an antifouling agent;
   filling the mold with a curable polymeric material; and
   curing the polymeric material and forming an article having a surface defined by the mold surface, the surface of the article having the plurality of metallic powder particles disposed thereon and comprising an antifouling coating,
   wherein metallic powder particles of the plurality of metallic powder particles have an average size of about 250 mesh to about 400 mesh.

2. The method of claim 1, wherein the coating comprises:
   inserting the plurality of powder particles into the mold; and
   moving the mold or the particles, or a combination thereof, to form a coating of the powder particles on the mold surface.

3. The method of claim 1, wherein the coating comprises spraying the powder particles onto the mold surface and mold release material.

4. The method of claim 1, wherein the filling the mold with the polymeric material comprises casting or injecting a thermoset polymer or a thermoplastic polymer, or a combination thereof, into the mold.

5. The method of claim 1, wherein the forming an article from the polymeric material having a surface defined by the mold surface comprises polymerizing a thermoset polymer or a thermoplastic polymer to form the article and define the surface.

6. The method of claim 1, wherein the metallic material is selected from the group consisting of lead, copper, cobalt, zinc, nickel, zirconium, molybdenum, tin, iron, manganese, and any combination thereof.

7. The method of claim 1, wherein the polymeric material comprises a thermoset elastomer.

8. The method of claim 1, wherein the article comprises an acoustic article for transmitting or receiving an acoustic signal, and further wherein the antifouling coating results in substantially no loss of the acoustic signal.

9. The method of claim 8, wherein the acoustic article is selected from the group consisting of a hydrophone, a marine acoustic transducer, a sonar dome, and an acoustic window.

10. A method of making an antifouling article, the method comprising:
    providing a mold having a mold cavity and a mold surface for defining an article;
    forming a mixture of a first curable polymeric material and a plurality of metallic powder particles comprising an antifouling agent;
    applying a layer of the mixture to the mold surface;
    filling the mold cavity with a second curable polymeric material prior to curing the first curable polymer; and
    curing the first polymeric material and the second polymeric material to form an article having a surface defined by the mold surface, the surface of the article having the plurality of metallic powder particles disposed thereon.

11. The method of claim 10, wherein filling the mold with the second curable polymeric material comprises one of casting and injecting a thermoset polymer or a thermoplastic polymer, or a combination thereof, into the mold.

12. The method of claim 10, wherein the first curable polymeric material and the second polymeric material comprise a thermoset elastomer.

13. The method of claim 12, wherein the thermoset elastomer is selected from the group consisting of an ester, epoxy, phenolic, imide, formaldehyde, silicone or urethane polymer, or a combination thereof.

14. The method of claim 10, wherein the wherein the first curable polymeric material and the second polymeric material comprise the same material.

15. The method of claim 10, wherein the metallic material is selected from the group consisting of lead, copper, cobalt, zinc, nickel, zirconium, molybdenum, tin, iron, manganese, and a combination thereof.

16. The method of claim 10, wherein the copper comprises a copper alloy.

17. The method of claim 10, wherein metallic powder particles have an average size of about 250 mesh to about 400 mesh.

18. The method of claim 10, wherein the article comprises an acoustic article for transmitting or receiving an acoustic signal and further wherein the antifouling coating results in substantially no loss of the acoustic signal.

19. The method of claim 18, wherein the acoustic article is selected from the group consisting of a hydrophone, a marine acoustic transducer, a sonar dome, and an acoustic window.

* * * * *